United States Patent Office 2,967,564
Patented Jan. 10, 1961

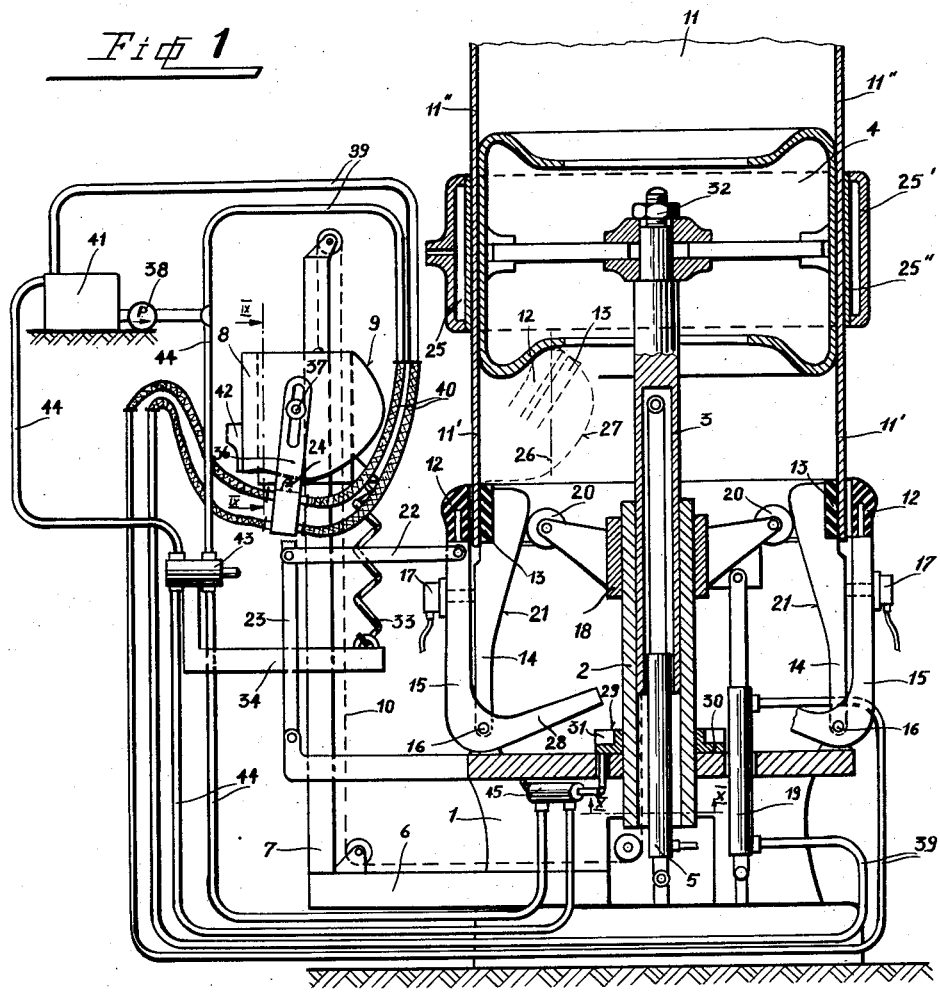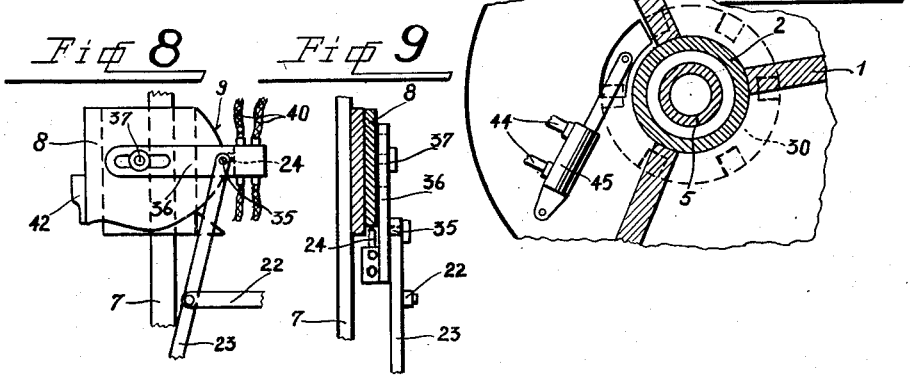

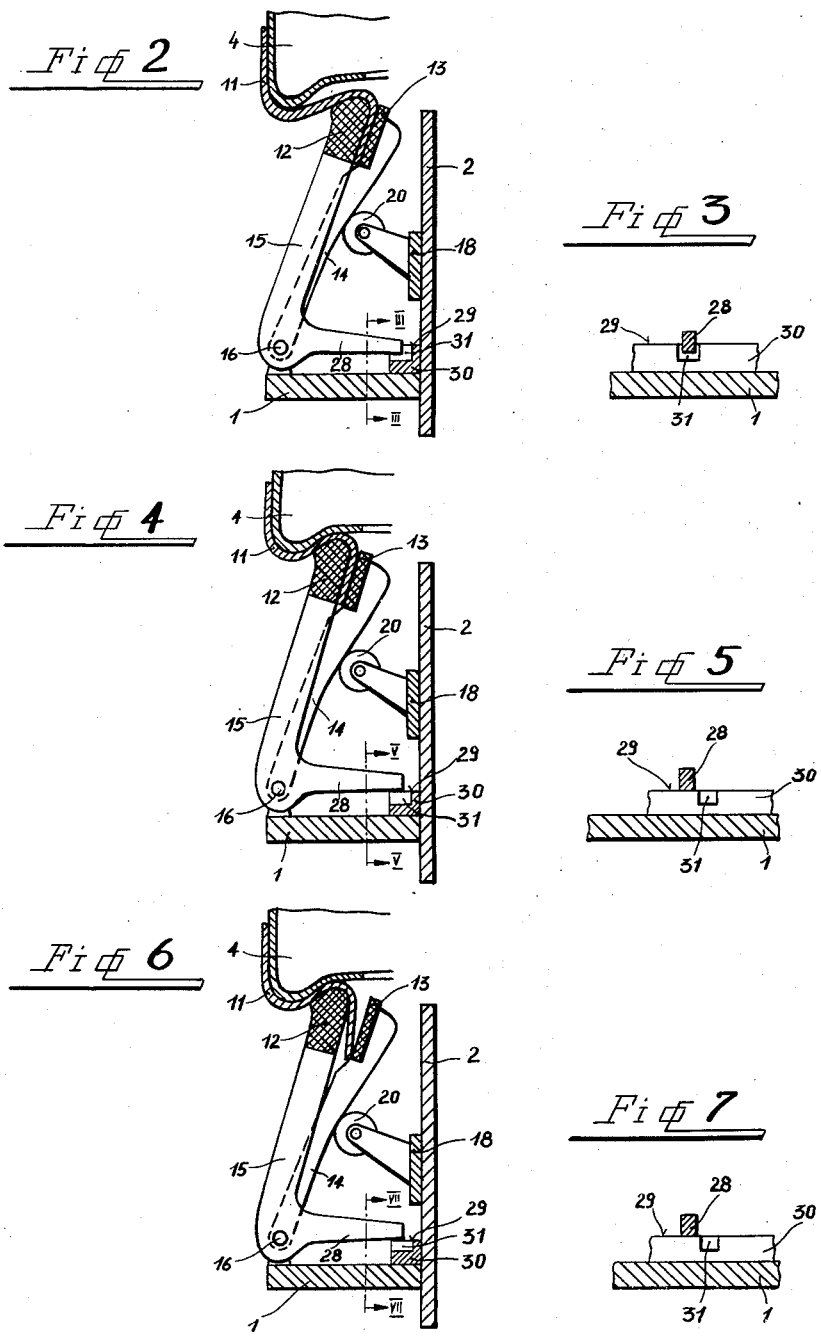

2,967,564

APPARATUS FOR MAKING A PNEUMATIC TIRE CARCASS

Walter Niclas, Altwarmbuchen, and Richard Beckadolph, Grasdorf, Hannover, Germany, assignors to Continental Gummi-Werke Aktiengesellschaft, Hannover, Germany Filed Oct. 19, 1954, Ser. No. 463,252

Claims priority, application Germany Oct. 23, 1953

8 Claims. (Cl. 154—9)

The present invention concerns the making of carcasses and, more specifically relates to a method of and device for making carcasses for pneumatic tires for vehicles, according to which the fabric layers placed on an annular body and forming the carcass are gripped by gripping means at the edge portions of said layers and are caused to bear against said annular body while said layers are being tensioned.

It is known radially and centrally to tension the fabric layers of the carcass by a backwards pulling movement of said gripping means, to thereby cause said fabric layers to bear against the stationary annular body. The gripped ends may during this tensioning operation pass through a certain tensioning curve. To carry out this method, a machine is required which is rather complicated in construction and thus is liable to breakdowns. This is due to the fact that the tensioning bands which grip the marginal areas of the fabric layer, and the links and levers connected thereto are arranged so as to be adjustable with regard to height and also to be movable in radial direction with regard to the annular body. In this connection it is necessary that the numerous levers and links which grip the circumferential portion of the tensioning bands are so designed that all elements will carry out a uniform movement as is required in order to cause said layers to bear against the annular body without the creation of any folds. Considering the great number of the movable elements and also keeping in mind that these elements in part carry out jerky movements, it will be obvious that the goal of causing the layers to bear against the annular body without folds is extremely difficult to obtain.

It is, therefore, an object of the present invention to provide a simplified method of and device for making carcasses for use in connection with pneumatic tires for vehicles, which will be free from the above outlined drawbacks.

It is another object of this invention to provide a method of and device for making carcasses for pneumatic tires for vehicles, which will allow the production of such carcasses with materially simplified means and at a considerably lower cost than heretofore possible.

These and other objects and advantages of the invention will appear more clearly from the following specification in connection with the accompanying drawings in which:

Fig. 1 diagrammatically illustrates a vertical central section through a machine according to the invention for making carcasses for pneumatic tires for vehicles.

Figs. 2 to 10 illustrate details of the machine according to Fig. 1, while

Fig. 3 is a section along the line III—III of Fig. 2,

Fig. 5 is a section along the line V—V of Fig. 4 and

Fig. 7 is a section along the line VII—VII of Fig. 6.

Fig. 9 is a section along the line IX—IX of Fig. 1

Fig. 10 is a section along the line X—X of Fig. 1.

*General arrangement*

In contrast to the heretofore known method of making carcasses for pneumatic tires for vehicles, the method according to the present invention consists primarily in that first an edge portion of the fabric layers is brought to bear against the annular body and then after the annular body has been turned by 180 degrees, the other edge portion is by means of the same gripping elements brought to bear against said annular body. This method already in itself represents a material simplification inasmuch as only one pair of grippers is required. Moreover this method according to the invention also makes it possible to select a considerably simpler support or mounting of the grippers so that the grippers have to carry out only a radial movement with regard to the annular body for instance while using a plurality of levers pivotally connected to fixed points and distributed over their circumference, while the relative movement between grippers and annular body in axial direction of said annular body is brought about by a movable support of the annular body. This solution differs considerably from the heretofore known methods inasmuch as the annular bodies heretofore employed are immovable in axial direction, whereas all movements of the grippers as required for bringing the fabric layers to bear against the annular body must be effected by the grippers or the guiding means therefor such as levers and links.

In conformity with a further development of the invention, the fabric layers arranged on the annular body, are at least during the working operation seized by means of a sleeve effective in the intermediate range of the fabric layers so that the fabric layers are immovably held between the sleeve and the annular body in such a manner that when one or the other edge portion of the fabric layers is processed, a distortion or sliding off of the fabric layers will be impossible.

*Structural arrangement*

Referring now to the drawings in detail, the machine is supported by a base 1 having a centrally arranged supporting pipe 2. A guiding cylinder 3 is movably journalled in the said supporting pipe 2. The carcass folding drum or core 4 which may be of any desired design and is required for the making of the carcass has its free end connected in such a manner that it can be quickly connected to and disconnected from the cylinder 3. This may, for instance, be effected by means of a bayonet joint, or by means of a bolt 32 as shown.

The upward and downward movement of the cylinder 3 with the drum or core 4 thereon is effected by means of a working cylinder 5 which latter is supplied with a pressure fluid such as oil fluid under pressure. Rigidly connected to the base 1 is a laterally protruding arm 6 which carries a guide 7 extending in the direction of the supporting pipe 2. A control element 8 with a cam surface 9 is slidably mounted on said guide 7. The control element 8 and the guiding cylinder 3 are interconnected by a tackle 10 in such a manner that both parts of the machine will carry out uniform movements. In other words, when cylinder 3 moves downwardly, the control element 8 also moves downwardly, and when the cylinder 3 is moved upwardly, the control element 8 is also lifted. A coil spring 33 always keeps the tackle 10 taut. One end of the spring 33 is connected to the element 8 while the other end of this spring is anchored to an arm 34 mounted on the guide 7.

The grippers for gripping the textile layers on drum 4 are designated with the reference numerals 12 and 13. The grippers are formed by annular bodies of elastic material and are supported by levers 14, 15 which in their turn and in pairs are tiltably mounted about fixed pivots 16 on base 1. Fluid operable means such as hydraulic motor means 17 are provided for opening the grippers, each lever pair 14, 15 having associated therewith one fluid operable means 17. Due to the elastic internal tension of the elastic usually pretensioned bands 12, 13 which form the grippers, the levers 14, 15 have the tendency to move radially inwardly. This movement, however, is prevented by means of a roller cage 18 movably mounted on supporting pipe 2. The upward and downward movement of said roller cage is effected by means of a plurality of power cylinders 19 connected to the circumference of the cage 18. The rollers 20 of the cage 18 serve as support for the levers 14 which rest against the rollers 20 by means of inclined cam surfaces 21.

A link 22 is connected with one of the levers 15 which are distributed over the circumference, while a further lever 23 is connected with the base 1. The arrangement is such that the links 22 and 23 are linked to each other and the upper end 35 of (Fig. 8) of the link 23 carries out the movement of the tip of the lever 15. The end 35 has associated therewith a hydraulic feeler 24 which cooperates with the adjacent cam surface 9 of the control element 8. The end 35 of the link 23 is connected to a tiltable arm 36 carrying the feeler 24. The arm 36 is slidable on a block or bolt 37 fixedly connected to the control element 8. The said block or bolt 37 has such a position in respect to the cam surface 9, that during the working operation of the machine, the feeler 24 is always vertically, or nearly vertically positioned in regard to the cam surface 9. This arrangement is essential because one feeler is sufficient to work together with a cam as shown.

According to Fig. 1 the hydraulic system for operating the cylinder 19 consists of a pump 38, pipes 39, flexible hoses 40, and a reservoir 41.

The drum 4 is provided with the fabric layers 11 outside the machine. In order to maintain the layers 11 stationary, a clamping sleeve 25 is employed which is effective within the middle range of the layers 11, said clamping sleeve preventing a displacement of the layers 11 during the working process. The said sleeve preferably consists of a rigid ring 25' and a diaphragm 25" operable by pressure fluid.

The operation of the machine is as follows:

After the drum or core 4 covered with the fabric layers 11 has been mounted on the cylinder 3, while the grippers 12, 13 are open, the drum or core 4 is lowered until the edges of the layers 11 are between the grippers 12 and 13. Thereupon the hydraulic motor means 17 are relieved so that the grippers 12, 13 close due to the effect of the elastic tensioning band 12 and grip the layers therebetween. When the drum or core 4 moves further downwardly, the grippers 12, 13 due to the common tilting movement of the levers 14, 15 perform a radially inwardly directed movement. This movement is controlled by the cam surface 9 and the feeler 24 which latter is operatively connected with the working cylinder 19, said cylinder bringing about a downward movement of the roller cage 18. The movement of the grippers 12, 13 corresponds to the distance determined by the cam surface 9. The grippers 12, 13 during the working operation must perform such relative movement with regard to the downwardly moving drum 4 that the edge portions 11' of the fabric layers always move tangentially with regard to the circumference of the drum or core 4. The movements of drum or core 4 and the movement of the grippers 12, 13 are harmonized with regard to each other in such a manner that when drum or core 4 occupies its respective lower end position, the grippers 12, 13 occupy the position shown in Figs. 4 and 6. That surface of gripper 12 which faces the drum or core 4 is shaped so that its contour will correspond to the contour of the corresponding parts of drum or core 4. The radially inwardly located tips of the gripper 12 are located on a line 26 which intersects the graph of movement 27 (shown in Fig. 1 as dashed line) at the lower range thereof.

The operation of causing the fabric layers to bear on the drum or core 4 is now completed, and it is necessary to open the grippers 12, 13 in order to be able to remove the drum or core 4 from its cylinder 3. After the fabric layers have been released by opening the grippers 12, 13, the drum or core 4 can be withdrawn and is now turned by 180 degrees so that the portions 11" of the fabric layers are adjacent the grippers 12, 13. During this changeover movement of the drum or core 4, the cylinder 3 is moved upwardly, and the grippers 12, 13 by lifting the cage 18 are returned to their starting position. The above described operation is then repeated while the portions 11" are brought to bear against the drum or core 4. It is, however, within the scope of the invention, that the portions 11" can be treated by another machine. Two or more machines as shown in the drawings can be employed, one or some of them can be employed for treating the portions 11', while the rest of the machines treat the portions 11".

The thus worked fabric layers are now removed together with the drum or core 4 and the bead cores and the further operations for completion of the carcass are carried out by another device.

As will be evident from Fig. 1, the levers 15 are designed as two arm levers in such a manner that the arm 28 can be made use of for limiting the radial inward movement of the gripper 12. The arm 28 cooperates with abutments 29 in such a manner that the latter will become effective just when the gripper 12 has reached its end position (Figs. 4 and 6). In this way, the tensioning forces of the elastic band 12 which are directed radially inwardly are nullified while simultaneously, however, with the downwardly moving roller cage 18 a further movement of the lever 14 radially inwardly is possible. Thus the opening of the gripper pairs is effected automatically, the movement of the gripper 12 being stopped while the lever 14 can move further inwardly.

As mentioned above, the line 26 intersects the graph of movement 27 during the working operation. In order to prevent the grippers from opening already at this time due to the arms 28 engaging the abutments 29, the ring 30 carrying the abutments 29 is provided with recesses 31 into which the arms 28 may move. The ring 30 is rotatably mounted on the base 1, and its movement is likewise controlled by the control member 8, for instance by cams 42 to be arranged laterally of the control member 8. The said last mentioned cams will, shortly before the grippers 12, 13 reach their end position, bring about a rotation of the ring 30 in such a manner that now the abutments 29 will become effective. The movement of the ring 30 is effected, when the cam 42 contacts the protruding end of a valve spool protruding from and reciprocable in a valve 43 which is operatively connected by hoses or pipes 44 with a small working cylinder 45 for moving the ring 30. From this time on, ring 30 is in rest position, i.e. the arms 28 can enter the recess 31 when it is not yet desired to open the grippers 12, 13. Fig. 6 shows the fixed arm 28 while the cage 18 moves downwardly for opening the lever 14. It is to be understood, that the ring 30 will be moved into its normal position according to Fig. 2 and Fig. 3, if cam 42 does not engage the valve spool of valve 43. According to Fig. 1 the pipes are connected to the power-set 38, 41 cooperating with the cylinders 19.

It may be mentioned that the foundation of the machine may be so selected that the axis of the drum 4 extends in horizontal or in inclined direction. It is also possible by the position of additional rotative devices for the drum 4 to allow the carrying out of further operations on the machine according to the invention for completion of the carcass.

The employment of a feeler member 24 with cam 9 pertaining thereto makes it possible quickly to vary the cam surface. By correspondingly selecting the contour of the cam, the pulling forces for causing the layers 11 to bear against the drum may be varied.

It is, of course, to be understood that the present invention is, by no means, limited to the particular construction shown in the drawings but also comprises any modifications within the scope of the appended claims.

What we claim is:

1. In a device for forming the carcass of a pneumatic tire; apparatus for shaping fabric for the carcass comprising a core about which said fabric is shaped, said core being movable along its axis from a first to a second position, means to clamp said fabric to said core with its margins extending axially outwardly, circumferential radially inwardly movable fabric gripping means mounted coaxially in a fixed position in the path of movement of said fabric, and operating means including means for moving said core from said first to said second position, means controlling engagement of said fabric gripping means to hold the adjacent margin of said fabric with the core at said first position, and means controlling radial inward movement of said fabric gripping means on movement of said core toward its second position to fold said fabric about said core on the side adjacent said gripping means.

2. In a device as claimed in claim 1, including means for releasing said gripping means after said core reaches said second position.

3. In a device as claimed in claim 1, in which said central portion of said fabric is clamped to said core and said means to clamp said fabric is a circumferential clamping means surrounding said central portion.

4. In a device as claimed in claim 1, in which said means controlling radial inward movement of said fabric gripping means include cam operated means actuated by movement of said core from said first to said second position.

5. In a device as claimed in claim 1, said core being removably mounted and symmetrical, so that it may be reversely mounted on the same type of machine to fold said fabric about said core on the opposite side.

6. In a device for forming the carcass of a pneumatic tire; apparatus for shaping fabric for the carcass comprising a core about which said fabric is shaped, said core being movable along its axis from a first to a second position, means to clamp said fabric to said core with its margins extending axially outwardly, circumferential radially inwardly movable fabric gripping means mounted coaxially in a fixed position in the path of movement of said fabric, said gripping means comprising a pair of opposed concentric inner and outer elastic elements movable toward each other to grip a margin of said fabric between them, and a plurality of pairs of inner and outer radially movable elements, said inner and outer elastic elements being fixed to said inner and outer movable elements respectively, the inner and outer movable elements of each pair being movable toward each other and the pairs of elements being movable radially inwardly with decrease in diameter of said elastic elements, operating means including means for moving said core from said first to said second position, means controlling engagement of said fabric gripping means to hold the adjacent margin of said fabric with the core at said first position, and means controlling radial inward movement of said fabric gripping means on movement of said core toward its second position to fold said fabric about said core on the side adjacent said gripping means.

7. In a device for forming the carcass of a pneumatic tire; apparatus for shaping fabric for the carcass comprising a supporting structure, a core about which said fabric is shaped, means mounting said core for movement along its axis relative to said structure, means to secure said fabric to said core for movement therewith, with its margins extending axially beyond said core, circumferential radially inwardly movable fabric gripping means mounted coaxially in a fixed position on said base, said gripping means comprising a pair of opposed, circumferential, concentric inner and outer elastic elements movable toward each other to grip a margin of said fabric between them, said elastic elements being inherently contractible by their inherent resilience to decrease the diameter of said fabric, a plurality of pairs of inner and outer radially movable levers, said inner and outer elastic elements being fixed to said inner and outer levers respectively, each pair of levers being pivoted about a common pivot on said base and being movable relative to each other and bodily movable as a unit with decrease in diameter of said elastic elements, and operating means including means for moving said core toward said base, means controlling relative movement of the inner and outer levers, respectively to control engagement of said elastic elements with said fabric, and means actuated on movement of said core toward said base to control inward bodily movement of said pairs of levers to fold said fabric about said core on the side of the core toward said base.

8. In a device as claimed in claim 7 in which the means to control inward bodily movement of said pairs of levers includes a replaceable element determining the pivotal movement of said levers relative to said core so that the fabric may be folded on to said core in accordance with different dimensions or conditions.

References Cited in the file of this patent

UNITED STATES PATENTS

| 2,451,973 | Purdy | Oct. 19, 1948 |
| 2,488,863 | Haase | Nov. 22, 1949 |
| 2,503,815 | Frohlich | Apr. 11, 1950 |
| 2,513,756 | Smyser | July 4, 1950 |
| 2,555,343 | Jones | June 5, 1951 |
| 2,565,071 | Frazier | Aug. 21, 1951 |
| 2,567,064 | Frazier | Sept. 4, 1951 |
| 2,605,198 | Haase | July 29, 1952 |

FOREIGN PATENTS

| 434,440 | Great Britain | Sept. 2, 1935 |